(12) United States Patent
Shahshahani

(10) Patent No.: US 8,880,099 B2
(45) Date of Patent: Nov. 4, 2014

(54) METHOD, DEVICE, AND SERVER FOR TRANSMITTING AND RESPONDING TO A LOCATION DECLARATION

(75) Inventor: Ben Shahshahani, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 271 days.

(21) Appl. No.: 13/271,730

(22) Filed: Oct. 12, 2011

(65) Prior Publication Data
US 2013/0095856 A1    Apr. 18, 2013

(51) Int. Cl.
*H04W 24/00* (2009.01)
*H04W 60/00* (2009.01)
*H04W 4/20* (2009.01)
*H04W 4/02* (2009.01)

(52) U.S. Cl.
CPC ............ *H04W 60/00* (2013.01); *H04W 4/20* (2013.01); *H04W 4/02* (2013.01)
USPC ................................. 455/456.3; 455/414.2

(58) Field of Classification Search
CPC .......... H04W 60/00; H04W 4/02; H04W 4/20
USPC .............. 455/456.3, 414.2; 705/14.13, 14.56, 705/14.58, 26.1, 14.22, 14.23, 14.25, 705/14.26; 755/14.13, 14.56, 14.58, 26.1, 755/14.22, 14.23, 14.25, 14.26
See application file for complete search history.

(56) References Cited

U.S. PATENT DOCUMENTS

| 7,546,254 | B2 | 6/2009 | Bednarek | |
|---|---|---|---|---|
| 2011/0035284 | A1* | 2/2011 | Moshfeghi | 705/14.58 |
| 2011/0082746 | A1* | 4/2011 | Rice et al. | 705/14.56 |

OTHER PUBLICATIONS

Mathew Honan (Wired Magazine 17.02, published Jan. 2009) I am Here: One Man's Experiment With the Location-Aware Lifestyle.*

* cited by examiner

*Primary Examiner* — Manpreet Matharu
(74) *Attorney, Agent, or Firm* — Berkeley Law & Technology Group, LLP

(57) ABSTRACT

Subject matter described pertains to methods, devices, and servers for transmitting and responding to a location declaration.

25 Claims, 3 Drawing Sheets

METHOD, DEVICE, AND SERVER FOR TRANSMITTING AND RESPONDING TO A LOCATION DECLARATION

BACKGROUND

Accurate and/or timely feedback of a customer's experience of an establishment, such as, for example, a restaurant or a nightclub, can be valuable to an operator of the establishment and to the public.

BRIEF DESCRIPTION OF THE DRAWINGS

Embodiments of claimed subject matter are illustrated by way of example and not by way of limitation in the figures of the accompanying drawings, in which:

DETAILED DESCRIPTION

Reference throughout this specification to "one implementation", "an implementation", or "particular implementations" means that a feature, structure, or characteristic described in connection with a described implementation(s) may be included in at least one implementation(s) of claimed subject matter. Thus, appearances of the phrase "in one example implementation", "in an example implementation," or "in particular example implementations," in various places throughout this specification are not necessarily all referring to the same implementation(s). Furthermore, particular features, structures, or characteristics may be combined in one or more implementations. In describing embodiments of claimed subject matter, the terms "coupled" and "connected" herein, along with their derivatives, may be used. It should be understood that these terms are not intended as synonyms for each other. Rather, in particular embodiments, "connected" may be used to indicate that two or more elements are in direct physical or electrical contact with each other. "Coupled" may be used to indicate that two or more elements are in direct or indirect (with other intervening elements between them) physical or electrical contact with each other, or that two or more elements cooperate or interact with each other.

Figure 1:
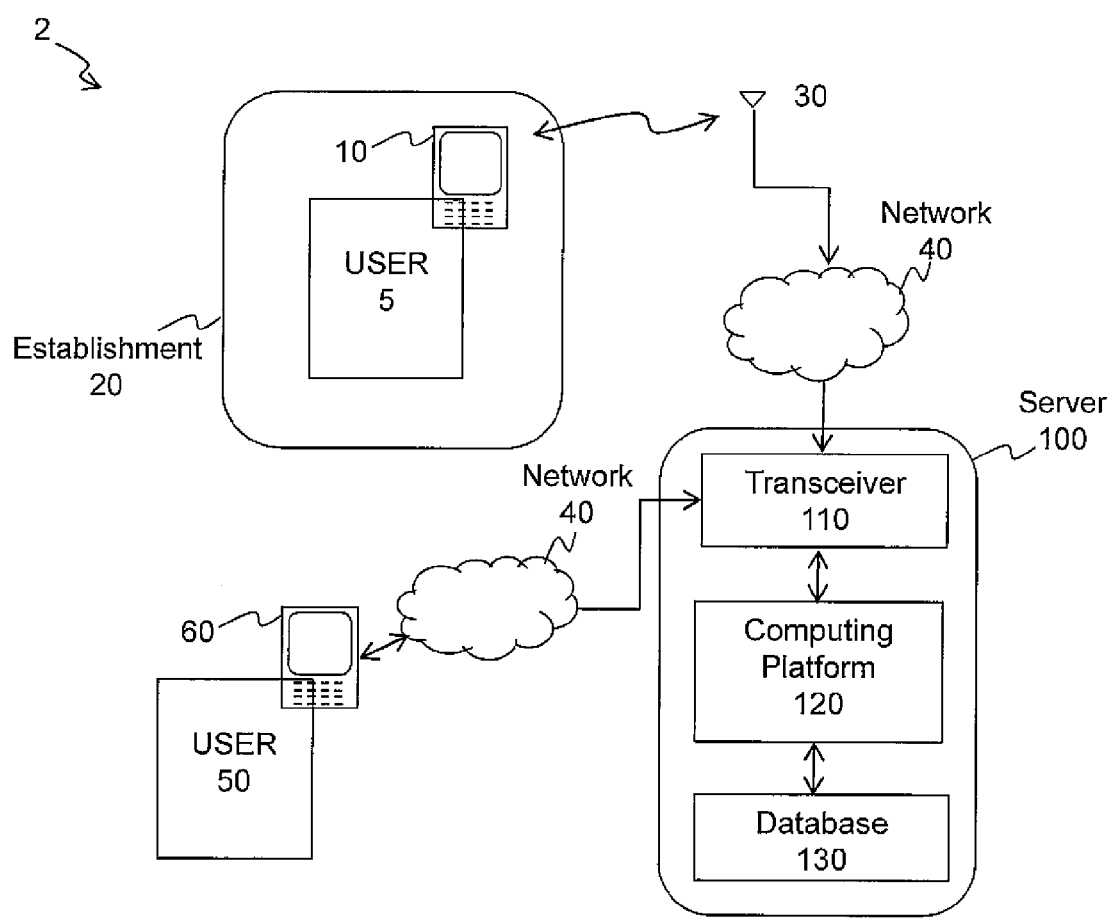
FIG. 1 shows an arrangement for transmitting and responding to a location declaration according to embodiments of claimed subject matter.

FIG. 1 shows an arrangement (2) for transmitting and/or responding to a location declaration according to embodiments of claimed subject matter. User 5 may carry client device 10 from location to location. Client device 10 may encode and store an information signal that associates user 5 with device 10, for example. In implementations, client device 10 may comprise a smart phone, a handheld computing device, a laptop computer, or any other type of client device capable of being carried with user 5 and coupling to the Internet by way of Wi-Fi, WWAN, a cellular infrastructure, and/or other arrangement that facilitates signaling interchanges with other computing or processing entities, and claimed subject matter is not limited to these implementations.

User 5 may move to a location proximate with establishment 20 and, for example, may perform a "location declaration" to notify server 100 of a current location. A location declaration may be defined as a signal that notifies server 100, for example, that a mobile client device is proximate with an establishment. By way of a location declaration, server 100 may notify, for example, other users of a social, professional, or other type of network of a user's arrival at establishment 20. In an implementation, user 5 may be notified of the presence of other users in a network at or nearby establishment 20, for example, by way of a location declaration from one or more other users.

In an embodiment, a location declaration may be entered by user 5 via a user interface of client device 10, for example, or may result from user 5 allowing device 10 to periodically or occasionally report a location of device 10. In implementations, a location declaration may be conveyed wirelessly from client device 10 to antenna 30, which may transmit and/or receive signals to and from network 40, for example, which may represent a signal transmission or computing infrastructure, such as the World Wide Web.

In describing some implementations, such as arrangement 2 of FIG. 1, a "location" may refer to a physical or a street address of an establishment, for example. In other implementations, a location may refer to a position derived from one or more signals received from a satellite positioning system such as the Global Positioning System (GPS), for example. In other implementations, a location may refer to a business name of an establishment, such as, for example, Wrigley Field, or may refer to a nickname or a moniker, for example, given to an establishment. In other implementations, a "location declaration" may refer to a broadcast, for example, by a user that may transmit an information signal that may identify a user's location by way of a user interacting with an interface of, including on, a handheld computing or communications client device.

In some implementations, a location declaration may perform a function similar to a "check-in," for example, in which a user may interact with a mobile client device to declare to other users in a social network or other type of network that the user has arrived at or near an establishment. In one implementation, a location declaration may result, at least in part, from a user permitting a location-based tracking service to track a user's location by way of a user's handheld mobile computing or communications device, for example. It should be noted that claimed subject matter is not limited only to the above-described implementations of a location declaration.

A location declaration from client device 10 may be received by server 100 through transceiver 110, for example. In an implementation, transceiver 110 may include an interface with a social network or other type of network that may receive a location declaration. In an implementation, transceiver 110 may receive a location declaration by way of user 5 designating server 100 as a recipient of a location declaration, for example. A location declaration may be conveyed, for example, from transceiver 110 to computing platform 120 by way of a communications bus that is capable of interfacing with various components and/or subsystems within server 100. However, this is merely an implementation and claimed subject matter is not limited in this respect.

Figure 2:
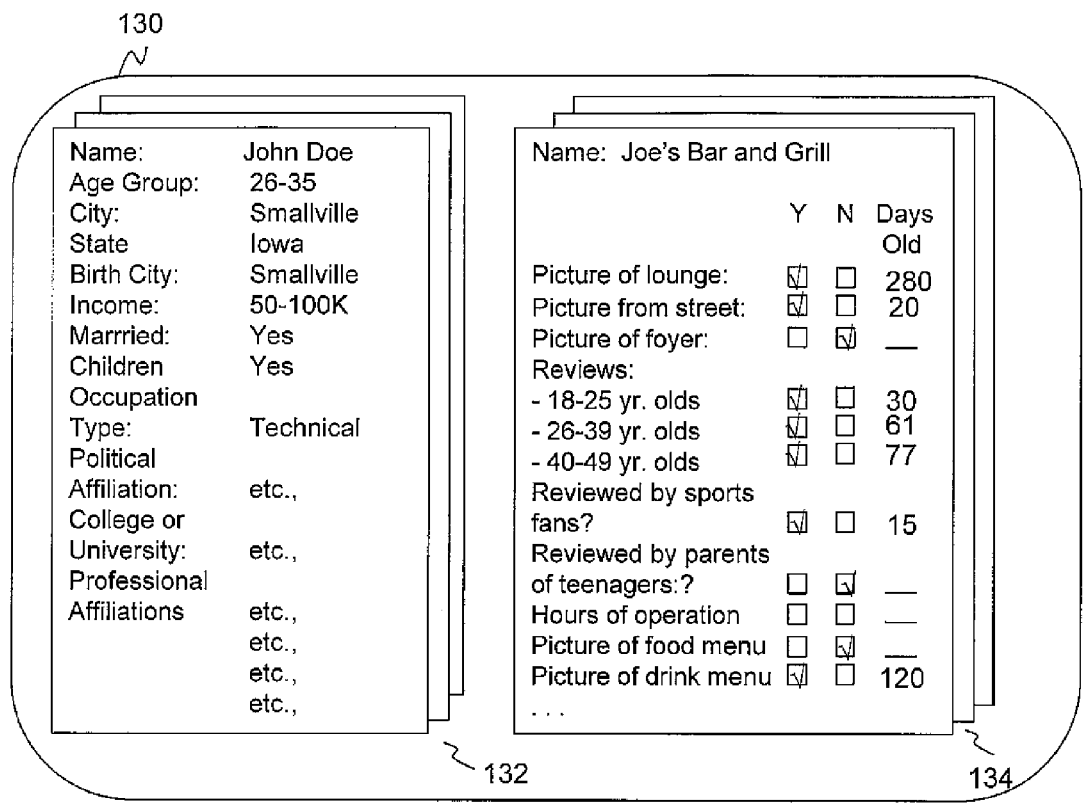
FIG. 2 shows a database, which may be used in the embodiment of FIG. 1.

In an implementation, computing platform 120 may access database 130 to determine one or more demographic identifiers that may be associated with user 5 as well as other users. Thus, FIG. 2 shows a database (130) which may be used in an embodiment such as the embodiment of FIG. 1. Database 130 may include groups of profiles, such as profile 132, for example, that may relate or associate a user with one or more of perhaps a large number of demographic identifiers. In a non-limiting example, database 130 may associate user 5 with a 26 to 35-year-old age group. Database 130 may relate or associate user 5 with other demographic identifiers such as, for example, a geographic region where user 5 was born, where user 5 lived during a period, or where user 5 may currently reside to provide a few non-limiting possible examples. In some implementations, user 5 may be associated with perhaps numerous demographic identifiers. Claimed subject matter is not limited to demographic identifiers shown and/or described.

In implementations, a demographic identifier may relate or associate, for example, a person or a user with one or more of perhaps a large number of particular features common to a group of people. Accordingly, a demographic identifier may relate to a user's age group or to a user's occupation type, such as administrative and/or professional, technical, or the like, for example. In an implementation, a demographic identifier may relate a user to a university, college, high school, trade school, or the like, that a user attended, just to name a few non-limiting examples. A demographic identifier may relate to a user's nationality, for example, such as American, Mexican, Canadian, or the like. A demographic identifier may refer to a user's income range, a user's marital status, number of children, ages of children, just to name a few more non-limiting examples. A demographic identifier may refer to a user's political affiliations, professional associations, associations with other individuals by way of a social network, or one of numerous other features that a user may share with a group. However, again, these are merely examples, and claimed subject matter is not limited in this respect.

In implementations, one or more demographic identifiers may be supplied if a user registers with a social or professional network, for example. In some implementations, a social or professional network may be represented by way of a pattern of relationships in the form of associational ties or links between interconnected nodes having various types of interdependency, such as friendship, kinship, common interests, activities, events, relationships of workplace, geographic location, religious beliefs, or the like, though claimed subject matter is not so limited.

In addition to storing demographic identifiers associated with user 5, for example, database 130 of FIG. 2 may include a list of attributes 134 of establishment 20 of FIG. 1. In an example, database 130 may identify an establishment entitled Joe's Bar and Grill and may include, for example, a list of attributes associated with Joe's Bar and Grill. Associated with a list of attributes, for example, may be an indication, such as "Y" or "N," which may indicate whether database 130 includes a certain attribute among the list of attributes. In an implementation, if an attribute is present in the list, an age of the attribute since being provided or updated, for example, may be indicated. Attributes associated with the establishment Joe's Bar and Grill, for example, may include a still picture or a video recording of a street view of Joe's Bar and Grill, a picture of a lounge or a foyer of the establishment, reviews by various users, and so forth, may be present in database 130. It should be noted, however, that claimed subject matter is not limited in this respect.

In some implementations, as suggested, attributes stored in database 130 may include user reviews or other comments referring to a user's experience or to a user's opinion of an establishment, for example. Some attributes, such as reviews and/or opinions, may be sorted by age group or by way of other demographic identifiers such as whether a reviewer may be a sports fan or a parent of teenagers, and so forth, just to name a few non-limiting examples. Database 130 may include, for example, one or more operating parameters of an establishment, such as an establishment's hours of operation, food or drink menu, and so forth. Although not shown in FIG. 2, database 130 may include numerous other attributes of an establishment that may be retrieved by computing platform 120, and claimed subject matter is not limited in this respect.

In an implementation, list of attributes 134 may include an indication of an age of an attribute since being provided or updated. In database 130, for example, although a picture of an establishment taken from the street may be current, taken just 20 days ago, for example, other pictures or images may be less current, such as a picture of a lounge area within Joe's, taken 280 days ago, for example. In an implementation, one or more attributes of list of attributes 134 may be uploaded by a user at or near establishment 20 to update less-current attributes as well as to supply attributes missing from list of attributes 134, for example. In an implementation, user 5 may be requested to upload a photograph of a food or a drink menu, for example, from establishment 20 to server 100. In exchange, user 5 may receive a coupon for a discount toward purchasing a food or drink item at an establishment, such as Joe's or another establishment. In an implementation, user 5 may be requested to upload a photograph of establishment 20 as viewed from outside of the establishment and may, for example, receive an "exchange value" for doing so.

In implementations, an "exchange value" may refer to a worth of a product or service that may represent a monetary or other exchangeable value, for example. In an implementation, an exchange value may be monetary and denominated in a local currency, for example. In an implementation, an exchange value may be expressed in terms of a product, for example, such as a drink, a manufactured item, a food item, or any combination thereof, or may enable user 5 to obtain one or more of the aforementioned at a reduced price. In an implementation, an exchange value may be expressed in terms of a service, such as a car wash, dry-cleaning, or yard service, just to name a few examples. In an implementation, an exchange value may represent one or more increments in a count of a "punch" card that may add toward a complementary food, drink, or other item in a restaurant, just to name a few examples. In an implementation, an exchange value may include one or more points that may count toward an online game in which points may be used to obtain certain privileges for at least a portion of the game, for example. In the aforementioned implementations, the examples of an exchange value described may represent only a few of numerous potential examples, and claimed subject matter is not limited in this respect.

In arrangement 2 of FIG. 1, user 50, by way of interaction with client 60, may desire to access database 130 of server 100 to obtain advice pertaining to establishment 20, for example. In a particular implementation, in the event that user 50 may be planning an evening out with friends, for example, user 50 may seek to obtain a review of Joe's Bar and Grill to aid in his or her planning. User 50 may wish to connect to server 100 by way of network 40, for example, so that user 50 may further investigate attributes of Joe's Bar and Grill.

In an implementation, an establishment may wish to cater to a particular clientele and may determine, for example, that an attribute uploaded by user 5 may be estimated to be of a different "exchange value" than an attribute uploaded by a different user. In a specific example, a nightclub that may cater to 18 to 25-year-olds may determine that an opinion or a review uploaded by a user between the ages of 18 and 25 may possess a greater estimated exchange value, for example, than a review uploaded by a user between the ages of 40 and 49. Thus, in a particular implementation, an establishment may estimate a relatively greater exchange value for a review from a user having a demographic identifier of an 18 to 25-year-old, for example, than a user having an identifier of a 40 to 49-year-old. In a particular implementation, in the event that user 50 is an 18 to 25-year-old, for example, user 50 may find reviews uploaded by other 18 to 25-year-olds to be of a greater value than reviews or opinions uploaded by 40 to 49-year-olds.

In a particular implementation, an establishment may estimate a "distance metric" between a target clientele and user 5, for example, and award an exchange value according to a distance metric. In a particular implementation, in which an establishment may cater to 18 to 25-year-olds, for example, reviews by 18 to 25-year-olds may result in an establishment assigning a distance metric of 0, for example, that suggests an alignment of user 5 with target clientele. In an implementation, a distance metric of 0 may result in an award having a greater exchange value, for example. In a particular implementation, a review by a user having a demographic identifier of a 26 to 39-year-old may possess a different and perhaps higher distance metric, which may, for example, result in an award having a moderate exchange value, for example. In a particular implementation, a review by a 40 to 49-year-old may perhaps be outside of a usable distance metric and may, for example, be assigned a lower exchange value.

In an implementation, an establishment may direct computing platform 120 of server 100 to maintain an up-to-date list of attributes 134. In a particular implementation, computing platform 120 may determine, for example, that a picture of a foyer, along with hours of operation, a review by parents of teenagers, and a picture of a menu of food items available at an establishment is not present within list of attributes 134. Accordingly, an establishment may offer an exchange value, for example, to a user in exchange for the user uploading one or more attributes that may not be currently present.

In other implementations, an exchange value may be determined by entities other than particular establishments. For example, an aggregator may find it desirable to maintain a directory of local businesses along with current and high-quality reviews, opinions, and other attributes of local businesses. In implementations, the use of aggregators allows a user, such as user 50, to investigate a group of establishments, such as, for example, establishments in the "Downtown" section of the particular city or town, without having to seek out reviews for individual establishments.

In an implementation, an establishment or an aggregator may recognize that certain entries of list of attributes 134 are "stale," which may suggest that an attribute may be outside of a certain age range, for example, or that the establishment may otherwise benefit from an updated attribute. In an implementation, an establishment may offer an exchange value, for example, to incentivize users to upload attributes so that entries of list of attributes 134 may be current and available for viewing by other users, such as user 50, for example.

In an implementation, list of attributes 134 may include a metric, such as a "quality metric," to aid in estimating an exchange value of one or more attributes, for example. In an implementation, a quality metric of an attribute may be assigned a higher exchange value, for example, if the attribute is current (i.e. not "stale") or has been uploaded by a user having a demographic identifier of a target market. As an attribute ages, a quality or other metric may decline, for example. In an implementation, if a quality or other metric of an attribute declines below a threshold, for example, an establishment may offer an exchange value that incentivizes a user to upload attributes, thereby assisting an establishment in keeping list of attributes 134 above a desired quality threshold. In an implementation, an exchange value may be set to a fixed amount in a manner that may encourage many users, including users outside of a target clientele, to upload attributes.

In an implementation, a metric may be assigned, for example, according to a user's history in uploading attributes. In an implementation, attributes provided by a user having a history of uploading high-quality reviews, perhaps characterized, for example, by detailed comments regarding an establishment or higher-resolution photographs of an establishment's features, may be assigned a relatively high quality metric. In an implementation, a review provided by another user having similar demographic identifiers, for example, but having a history of providing lower-quality reviews may be assigned a lower quality metric. In other implementations, a quality metric may be dependent upon criteria other than described above, and claimed subject matter is not limited in this respect.

In an implementation, list of attributes 134 may include multiple entries for a given attribute. In a particular implementation, an establishment may identify benefit from having multiple photographs of a street view of an establishment and/or may identify benefit from having photographs taken during various times of the day, for example. In another implementation, an establishment may identify benefit from having multiple pictures taken of features of an establishment, for example, perhaps identifying benefit from having one or more images taken at breakfast, lunch, or dinner. In an implementation, an establishment may request multiple users having various demographic identifiers to upload more than one entry in list of attributes 134, for example. In an implementation, requests may be associated with an exchange value related to an estimated benefit that an establishment places on populating list of attributes 134 with multiple current entries for an attribute, for example.

In an implementation, at least a portion of database 130 may be downloaded to client device 10, which may allow a user to be aware of one or more exchange values associated with uploading attributes to database 130 without the use of a real-time exchange of information signals between client device 10 and server 100. In an implementation, client device 10 may store demographic identifiers of user 5, which may allow client device 10 to estimate exchange values for user 5. In one possible example, if a user is planning a vacation at a remote establishment, perhaps at a location where coupling to the Internet may be difficult or impossible, the user may nonetheless be able to upload attributes to server 100 upon returning from the remote establishment.

Figure 3:
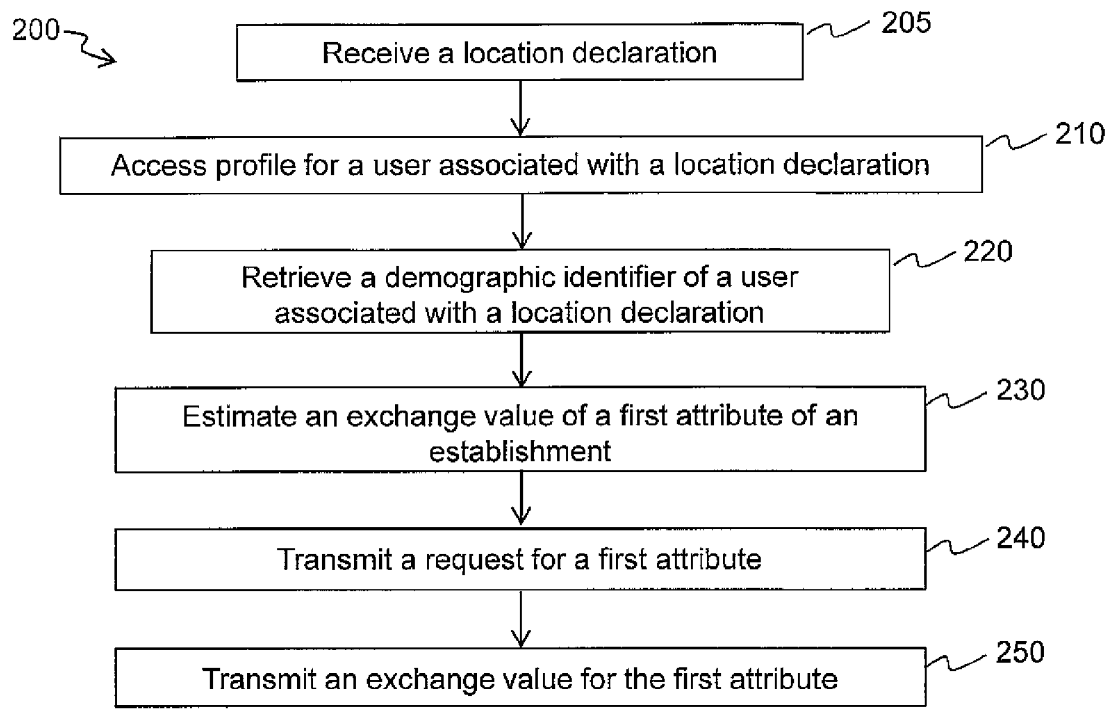
FIG. 3 shows at least part of a method for responding to a location declaration according to embodiments of claimed subject matter.

FIG. 3 (200) shows at least a part of a method for responding to a location declaration according to embodiments of claimed subject matter. In some embodiments, the apparatus of FIG. 1 may be suitable for performing the method of FIG. 3, although nothing prevents performing the method of FIG. 3 using alternate arrangements of components in other embodiments. Embodiments of claimed subject matter may include additional blocks other than those shown and described in FIG. 3, fewer blocks than those shown and described, blocks occurring in an order different from FIG. 3, or any combination thereof.

FIG. 3 begins at block 205 in which a location declaration may be received from a client mobile computing or communications device, for example. In an implementation, a location declaration may result from a user declaring to other users in a social or other type of network that a user has arrived at an establishment. A location declaration may result from a user permitting a location-based service, which may operate on a server, to track location of the user by way of a client mobile computing or communications device, although claimed subject matter is not limited in this respect.

Continuing at block 210, a profile for a user associated with a received location declaration may be accessed. In an implementation, a profile may be stored in a database, such as database 130 of FIG. 1, for example. At block 210, a location declaration may be received by way of a server having an interface to a social network, for example. Continuing, block 220 may comprise retrieving a demographic identifier of a user associated with a received location declaration. In an implementation, a demographic identifier may relate or associate a user with one or more particular features common to a group.

Continuing at 230, a computing platform may estimate an exchange value of a first attribute for an establishment corresponding to a received location declaration. In an implementation, an estimated exchange value may be assigned to an attribute by an establishment or by an aggregator resulting from, at least in part, a desire for an attribute to be uploaded by a user at or nearby an establishment. An exchange value may be assigned to an attribute, at least in part, as a result of: detecting that an attribute may not be present in a database, detecting that an attribute present in a database may be stale, detecting a quality metric of an attribute, detecting a distance metric between a user and a target clientele, detecting a user's history of providing attributes, or any combination thereof. In other implementations, exchange values may result from different criteria, and claimed subject matter is not limited in this respect.

Continuing at block 240, a request for a first attribute may be transmitted to a user located at an establishment. At block 250, an exchange value for a first attribute may be transmitted to a user located at an establishment.

Figure 4:
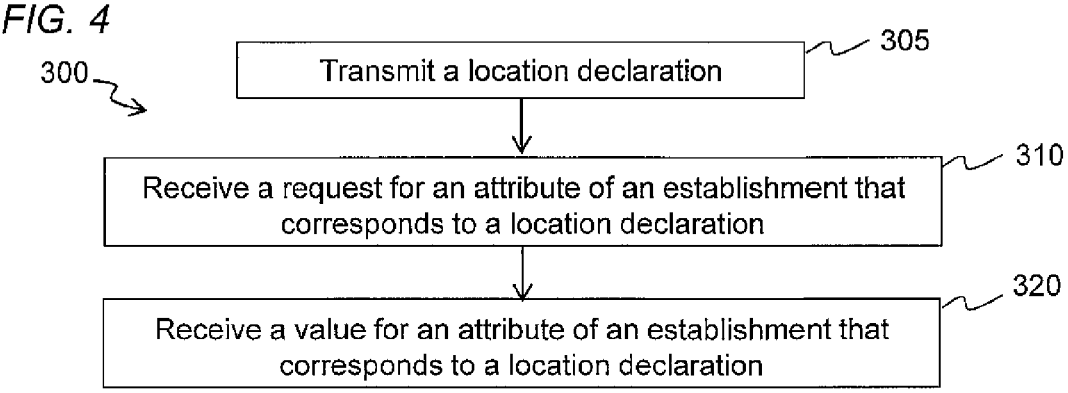
FIG. 4 shows at least part of a method for transmitting a location declaration according to an embodiment of claimed subject matter.

FIG. 4 (300) shows at least part of a method for transmitting a location declaration according to embodiments of claimed subject matter. In an implementation, client device 10 of FIG. 1 may perform the method of FIG. 4, although nothing prevents performing the method using alternative structures or components. Embodiments of claimed subject matter may include additional blocks other than those shown and described in FIG. 4, fewer blocks than those shown and described, blocks occurring in an order different from FIG. 4, or any combination thereof.

The method of FIG. 4 begins at block 305 in which a location declaration may be transmitted by way of a client handheld mobile computing or communications device, for example. In an implementation, a location declaration may be transmitted as part of a check-in operation in which a client device, such as client device 10 operated by user 5 of FIG. 1, may declare to other users in a social network, for example, that the user has arrived at or near an establishment. In an implementation, a location declaration may be transmitted, at least in part, without user interaction with a client device. For example, a client device may transmit a location declaration resulting from a user permitting a location-based service, which may be located on a server, to track a user's location by way of a user's handheld mobile computing or communications device.

Continuing at block 310, a request for an attribute of an establishment that corresponds to a location declaration may be received. In an implementation, an attribute may refer to a record of or perhaps a recording of a feature, a characteristic, or an aspect of a particular establishment. Block 320 includes a client device receiving an exchange value for an attribute pertaining to an establishment that corresponds to a location declaration.

Some portions of the preceding detailed description have been presented in terms of logic, algorithms or symbolic representations of operations on binary states stored within a memory of a specific apparatus or special purpose computing client device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "receiving," "determining," "transmitting," "accessing," "estimating," "retrieving," "detecting," "processing," "communicating," "identifying," or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific device" may include a general-purpose computer once it is programmed to perform particular functions pursuant to instructions from program software.

Embodiments of claimed subject matter may include methods, systems, or apparatuses for performing operations herein. A system or apparatus may be specially constructed for desired purposes, or a system or apparatus may comprise a general-purpose computing device selectively activated or reconfigured by a computer program stored in memory. A program may be stored on a storage medium, such as, but not limited to, any type of disk including floppy disks, optical disks, compact disc read only memories (CD-ROMs), magnetic-optical disks, read-only memories (ROMs), random access memories (RAMs), nonvolatile memories such as electrically programmable read-only memories (EPROMs), electrically erasable and programmable read only memories (EEPROMs), or FLASH memories, phase change memories (PCM), or any other type of media suitable for storing electronic instructions, and capable of being coupled to a system bus for a computing device.

It will, of course, be understood that, although particular embodiments have just been described, claimed subject matter is not limited to a particular embodiment or implementation. For example, one embodiment may be in hardware, such as implemented in a system, a subsystem, or an arrangement of components or devices, for example. Likewise, although claimed subject matter is not limited in this respect, one embodiment may comprise one or more articles, such as a storage medium or storage media that may have stored thereon instructions capable of being executed by a specific or special-purpose system or apparatus, for example, to result in performance of an embodiment of a method in accordance with claimed subject matter, such as one of the embodiments previously described, for example. However, claimed subject matter is, of course, not limited to one of the embodiments previously described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the purview of claimed subject matter.

What is claimed is:

1. A method comprising:
    receiving a location declaration at a server;
    determining that a first attribute for an establishment corresponding to said location declaration has an exchange value;
    transmitting a request for said first attribute;
    accessing a database of said server to determine said first attribute for an establishment, said database comprising a list of attributes of said establishment, said first attribute for an establishment having an age corresponding to an age since being provided or updated, wherein said first attribute comprises a user review or comment; and
    determining said exchange value based at least in part on said age of said first attribute, wherein said exchange value corresponds to a monetary or other exchangeable value to be transmitted to a user in exchange for the user uploading said first attribute.

2. The method of claim 1, wherein said location declaration is received by way of an interface to a social network.

3. The method of claim 1, wherein said determining further comprises:
    accessing a profile for a user associated with said location declaration.

4. The method of claim 3, wherein said accessing said profile comprises:
    retrieving a demographic identifier of said user associated with said location declaration.

5. The method of claim 1, wherein said determining further comprises:
    detecting that said first attribute is not present in a database; and
    estimating said exchange value as a result of said detecting.

6. The method of claim 1, wherein said determining further comprises:
    detecting that said first attribute, stored in a database, is stale; and
    estimating said exchange value as a result of said detecting.

7. The method of claim 1, further comprising:
    transmitting said exchange value of said attribute to a source that generated said location declaration.

8. The method of claim 1, wherein said determining further comprises:
    determining an exchange value of a second attribute for said establishment corresponding to said location declaration, said exchange value of said second attribute being different than said exchange value for said first attribute.

9. A method of using a client device, comprising:
    said client device transmitting a location declaration; and
    said client device receiving a request for an attribute of an establishment that corresponds to said location declaration, said request being accompanied by an exchange value, wherein said exchange value is based at least in part on an age of said first attribute, and further wherein said exchange value corresponds to a monetary or other exchangeable value to be transmitted to a user in exchange for the user uploading said first attribute.

10. The method of claim 9, wherein said exchange value is based, at least in part, on at least one demographic identifier of a user of said client device.

11. The method of claim 9, wherein said exchange value is a fixed value.

12. The method of claim 9, wherein said transmitting results from said client device comprises processing a check-in operation received by way of a user interface on said client device.

13. The method of claim 9, wherein said transmitting further comprises:
    said client device communicating with a social network.

14. The method of claim 9, wherein said attribute for said establishment comprises one or more of the following:
    a picture, a video, an audio recording, a review, an operating parameter, or any combination thereof.

15. A server comprising:
    a location declaration transceiver coupled to a computing platform, said computing platform to:
        retrieve an attribute of an establishment corresponding to a location declaration received from a client device;
        transmit a request for said attribute to said client device by way of said transceiver;
        access a database of said server to determine said first attribute for an establishment, said database comprising a list of attributes of said establishment, said first attribute for an establishment to have an age corresponding to an age since being provided or updated, wherein said first attribute to comprise a user review or comment; and
        determine said exchange value based at least in part on said age of said first attribute, wherein said exchange value to correspond to a monetary or other exchangeable value to be transmitted to a user in exchange for the user uploading said first attribute.

16. The server of claim 15, wherein said transceiver is capable of receiving an information signal that associates a user with said client device.

17. The server of claim 16, wherein said computing platform additionally is capable of retrieving a demographic identifier associated with said user of said client device.

18. The server of claim 17, wherein said computing platform additionally is capable of assigning an exchange value for said attribute of said establishment as a result of retrieving said demographic identifier.

19. The server of claim 18, wherein said computing platform additionally is capable of assigning an exchange value for said attribute of said establishment as a result of calculating a distance metric between said demographic identifier and a target clientele.

20. The server of claim 15, wherein said computing platform additionally is capable of determining that said retrieved attribute is below a threshold.

21. The server of claim 20, wherein said threshold refers to an age of said retrieved attribute.

22. The server of claim 20, wherein said threshold refers to a quality metric of said retrieved attribute.

23. The method of claim 1, wherein said establishment has a physical or street address and a clientele, and said first attribute for an establishment is received from a user in response to said transmitted request for said first attribute.

24. A method comprising:
receiving a location declaration at a server;
determining that a first attribute for an establishment corresponding to said location declaration has an exchange value;
transmitting a request for said first attribute;
accessing, via an interface to a social network, a profile of a user for whom said location declaration has been received to determine said exchange value for said first attribute, wherein said first attribute comprises at least one of a photograph or a review of said establishment;
determining said exchange value for said first attribute of said establishment based at least in part on a distance metric to suggest a demographic distance between a user from whom said location declaration is received and a target clientele of said establishment and a quality metric to incentivize transmission of said first attribute of a desired quality; and
transmitting said exchange value to said user in exchange for reception of said first attribute from said user, wherein said exchange value comprises a coupon.

25. A method comprising:
receiving a location declaration at a server;
determining that a first attribute for an establishment corresponding to said location declaration has an exchange value;
transmitting a request for said first attribute;
notifying one or more other users of a social network of a proximity of a user relative to said establishment, wherein said notifying one or more other users is based, at least in part, on said location declaration, which comprises a signal notifying the server that a mobile device of said user is proximate with said establishment, and further wherein said location declaration signal refers to at least one of a physical address, a street address, or a satellite positioning-derived position;
accessing a database to retrieve a demographic identifier for said user, said database comprising groups of user profiles relating users with one or more demographic identifiers comprising at least one of a geographic region of birth, a geographic region of current and/or past habitation, an age group, an occupation type, or an educational institution attended; and
determining said exchange value based at least in part on said retrieved demographic identifier for said user.

* * * * *